No. 779,744. PATENTED JAN. 10, 1905.
W. SHAKESPEARE, Jr.
FISH BAIT OR LURE.
APPLICATION FILED AUG. 18, 1902.
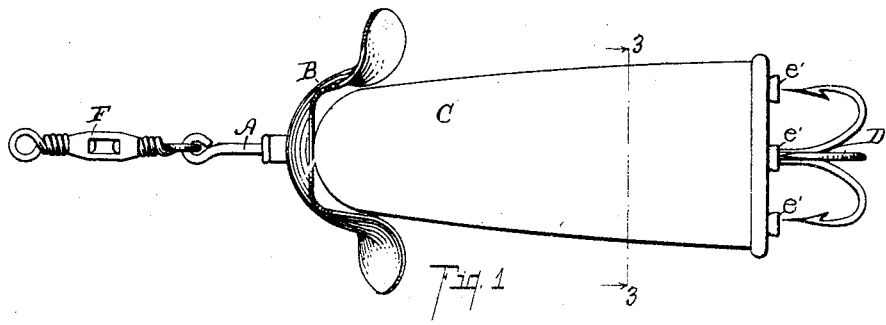
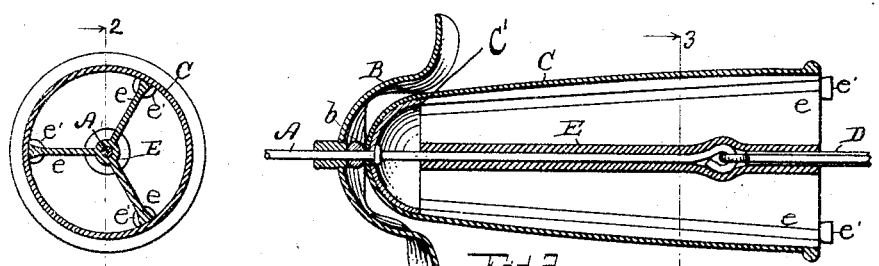
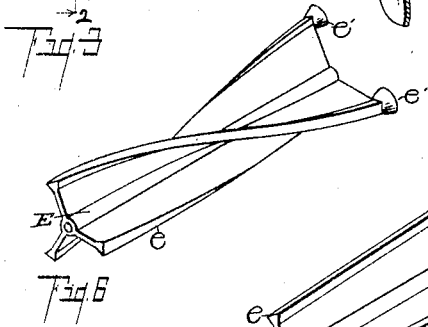
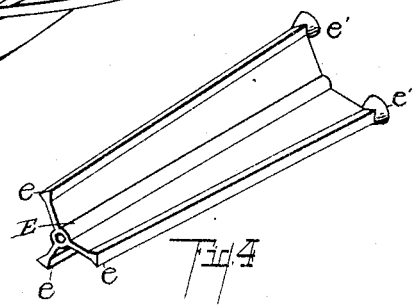
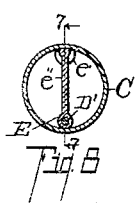
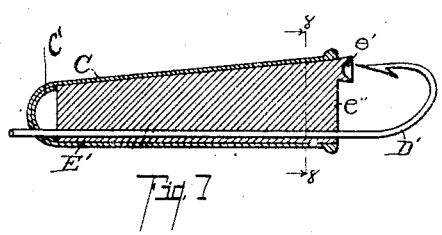
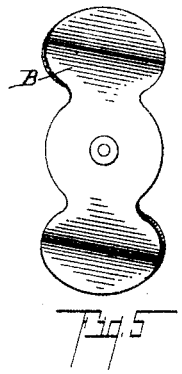
Witnesses:
Otis A. Earl
Amelia J. Alber
Inventor,
William Shakespeare Jr
By Fred L. Chappell
Att'y.

No. 779,744.    Patented January 10, 1905.

UNITED STATES PATENT OFFICE.

WILLIAM SHAKESPEARE, JR., OF KALAMAZOO, MICHIGAN.

FISH BAIT OR LURE.

SPECIFICATION forming part of Letters Patent No. 779,744, dated January 10, 1905.

Application filed August 18, 1902. Serial No. 120,029.

*To all whom it may concern:*

Be it known that I, WILLIAM SHAKESPEARE, Jr., a citizen of the United States, residing in the city of Kalamazoo, in the county of Kalamazoo and State of Michigan, have invented certain new and useful Improvements in Fish Baits or Lures, of which the following is a specification.

This invention relates to improvements in weedless baits or hooks.

The objects of the invention are, first, to provide an improved weedless bait or hook which shall be effective for that purpose and at the same time possess all the advantages of the plain hooks; second, to provide an improved weedless hook which is attractive as a bait or lure; third, to provide an improved weedless hook which is simple and economical to produce and durable in use.

Further objects will definitely appear in the detailed description to follow.

I accomplish the objects of my invention by the devices and means described in the following specification.

The invention is clearly defined and pointed out in the claims.

A structure embodying the features of my invention is fully illustrated in the accompanying drawings, forming a part of this specification, in which—

Figure 1 is a side elevation view of a structure embodying the features of my invention. Fig. 2 is a detail longitudinal sectional view taken on a line corresponding to line 2 2 of Fig. 3. Fig. 3 is a detail cross-sectional view taken on line 3 3 of Fig. 2. Fig. 4 is a perspective view of the guard E. Fig. 5 is a plan view of the spinner B. Fig. 6 is a perspective view of the guard E slightly modified in form. Fig. 7 is a detail longitudinal sectional view taken on line 7 7 of Fig. 8, showing the structure modified for a bait having but one hook. Fig. 8 is a detail cross-sectional view taken on line 8 8 of Fig. 7.

In the drawings the sectional views are taken looking in the direction of the little arrows at the ends of the section-lines, and similar letters of reference refer to similar parts throughout the several views.

Referring to the lettered parts of the drawings, A is the central support and connection of my improved bait, preferably of wire. D represents a hook which is secured to the rear of the wire A. F is a swivel connection for the line and is secured to the front end of the wire A. B is a spinner carried by the central support A, a suitable bead, as $b$, being provided to form suitable bearings therefor. These parts are of the usual construction, the hook D being of the common triple-hook variety. These parts may, however, be of any style desired.

A guard E, having wing-like extensions $e$ with cup-like tips $e'$ at the rear, is arranged on the wire A and the shank of the hook, so that the cup-like tips are supported in front of the points of the hooks. This arrangement holds the hook and guard in proper relation to each other. If it is desired, the guard may be slipped up on the rod A and the hook removed or another substituted. The guard E is preferably provided with a wing or extension $e$ for each point of the hook, and these wings are supported just in front of and extend outwardly slightly beyond the points of the hook, so that the same are fully protected when the wings are in their normal position.

Carried by the wire A is a cap C'. A casing C is arranged over and held in position by this cap. This casing C is of such size as to extend over the wings of the guard E and loosely embrace the same. The guard E and casing C are formed of some elastic or resilient material, preferably rubber, so that while they normally guard the points of the hooks they are easily deflected, as by the strike of a fish, and readily return to the normal position when released.

The modified structure illustrated in Figs. 7 and 8 is adapted to single hooks. The guard E is here formed with a single extension or wing $e''$. The casing C is here substantially the same as in the structures illustrated in Figs. 1, 2, and 3, only smaller to embrace the single hook D'.

A very satisfactory structure is secured if the casing C is omitted, as the hooks are still well protected, although not to the same degree. The structure having the casing C, however, possesses many advantages, as it is capable of any decoration desired to increase its effectiveness as a lure. It also makes the bait more effective as a lure by creating a greater disturbance when drawn through the water than will occur when the structure is used with the casing omitted.

I sometimes twist or make the wings *e* spiral, as is illustrated in Fig. 6, which makes the guard an effective spinner and otherwise increases its efficiency, the hook being revolved with the same. The structure may be still further modified by omitting the tips *e'* and still operate very successfully, though the tips are of advantage.

Other modifications in structural details will readily occur to those skilled in the art to which the structure relates. The structure illustrated is, however, preferred by me, as it combines all the advantages and is at the same time an economical structure to produce and very effective for the purposes for which it is intended.

Having thus described my invention, what I claim as new, and desire to secure by Letters Patent, is—

1. In an artificial bait or lure, the combination of a central support A; a hook D secured thereto; a guard E of elastic material having wing-like extensions *e* with tips *e'* arranged on said central support and the shank of said hook, so that said tips *e'* are normally supported in front of the points of said hook; a cap C' carried by said central support; a casing C of elastic material arranged over said cap and embracing said guard E; and a suitable spinner carried by said central support, all coacting for the purpose specified.

2. In an artificial bait or lure, the combination of a central support A; a hook D secured thereto; a guard E of elastic material having wing-like extensions *e*, with tips *e'* arranged on said central support and the shank of said hook, so that said tips *e'* are normally supported in front of the points of said hook; a cap C' carried by said central support; a casing C of elastic material arranged over said cap and embracing said guard E, all coacting for the purpose specified.

3. In an artificial bait or lure, the combination of a central support A; a hook D secured thereto; a guard E of elastic material, having wing-like extensions *e* with tips *e'* arranged on said central support and the shank of said hook, so that said tips *e'* are normally supported in front of the points of the hook; and a suitable spinner carried by said central support, all coacting for the purpose specified.

4. In an artificial bait or lure, the combination of a central support A; a hook D secured thereto; a guard E of elastic material having wing-like extensions *e* with tips *e'* arranged on said central support and the shank of said hook, so that said tips *e'* are normally supported in front of the points of said hook, all coacting for the purpose specified.

5. In an artificial bait or lure, the combination of a central support A; a hook D secured thereto; a guard E of elastic material having wing-like extensions *e* with tips *e'* arranged on said central support and the shank of said hook, so that said tips *e'* are normally supported in front of the points of said hook; and a casing C of elastic material embracing said guard, for the purpose specified.

6. In an artificial bait or lure, the combination of a central support A; a hook D secured thereto; a guard E of elastic material having wing-like extensions *e* arranged on said central support and the shank of said hook; and a casing C of elastic material embracing said guard, all coacting for the purpose specified.

7. In an artificial bait or lure, the combination of a hook; a guard of elastic material having wing-like extensions arranged on the shank of said hook; and a casing of elastic material embracing said guard, for the purpose specified.

8. In an artificial bait or lure, the combination of a hook; a guard arranged on the shank thereof, having elastic wing-like extensions projecting normally in front of and out of contact with the points of said hook, for the purpose specified.

9. In an artificial bait or lure, the combination of a hook; a guard of elastic material having a wing-like extension arranged on the shank of said hook, so that said extension is normally supported in front of the points of said hook; and a casing of elastic material embracing said guard, as specified.

10. In an artificial bait or lure, the combination of a hook; a guard arranged on the shank of said hook having an elastic wing-like extension projecting normally in front of and out of contact with the point of said hook, as specified.

11. In an artificial bait or lure, the combination of a hook; a casing of elastic material; and elastic supports for said casing carried by said hook, for the purpose specified.

12. In a fish bait or lure, the combination of a hook; a casing of elastic material arranged on the shank of said hook so that it is normally held in front of and out of contact with the point thereof, for the purpose specified.

In witness whereof I have hereunto set my hand and seal in the presence of two witnesses.

WILLIAM SHAKESPEARE, JR. [L. S.]

Witnesses:
OTIS A. EARL,
AMELIA J. ALBER.